United States Patent [19]

Ninomiya et al.

[11] Patent Number: 5,260,237
[45] Date of Patent: Nov. 9, 1993

[54] OVERCOATING INORGANIC COMPOSITION

[75] Inventors: Hideaki Ninomiya, Tokyo; Toshinobu Miyakoshi, Funabashi; Ryoichi Kondo; Takashi Kamiya, both of Narita, all of Japan

[73] Assignee: TDK Corporation, Tokyo, Japan

[21] Appl. No.: 849,597

[22] Filed: Mar. 11, 1992

[30] Foreign Application Priority Data

Mar. 11, 1991 [JP] Japan .................. 3-44758
Mar. 3, 1992 [JP] Japan .................. 4-45784

[51] Int. Cl.$^5$ .......................... C03C 8/14; C03C 4/16
[52] U.S. Cl. ...................... 501/32; 501/17; 501/75; 501/77
[58] Field of Search ............... 501/15, 17, 32, 75, 501/77

[56] References Cited

FOREIGN PATENT DOCUMENTS 59-45616 11/1984 Japan .
62-10940 3/1987 Japan .
1-132194 5/1989 Japan .

*Primary Examiner*—Karl Group
*Attorney, Agent, or Firm*—Oblon, Spivak, McClelland, Maier & Neustadt

[57] ABSTRACT

An overcoating inorganic composition is applied to a ceramic substrate for forming an overcoat thereon which has improved flexural strength, matches in thermal expansion with the substrate, and is reliable in that it is free of a crack and causes no variation in the resistance of thick film resistors even under rigorous service conditions. The overcoating inorganic composition contains 70-90% by volume of an inorganic glass component and 10-30% by volume of mullite powder and has a coefficient of thermal expansion in the range of from $50 \times 10^{-7}$ to $75 \times 10^7$/° C.

3 Claims, 5 Drawing Sheets

OVERCOATING INORGANIC COMPOSITION

This invention relates to an inorganic composition for forming crack-free, high strength overcoats on ceramic substrates for protecting thick film conductors and thick film resistors thereon.

BACKGROUND OF THE INVENTION

In response to a demand for higher density packaging, multilayered ceramic substrates having conductors interposed therein are now on the verge of practical use. The materials used for such substrates are low-temperature firable substrate materials which can be fired below 1,000° C. so that Ag and similar conductive materials having a low resistance may be fired at the same time. The inventors previously proposed a low-temperature cofirable substrate material having high strength in Japanese Patent Application Kokai No. 132194/1989. Such a low-temperature cofirable substrate is used by printing a resistor 1 and a conductor 2 on a low-temperature cofirable substrate 3 as shown in FIG. 1 whereupon it is covered with an overcoat 4 of inorganic glass material. However, if the low-temperature cofirable substrate 3 is fired after it is covered with the overcoat 4, there arises the problem that cracks 5 can generate due to thermal shocks in the overcoat 4 particularly in proximity to the conductor 2. Cracking entails problems of varying the resistance of the resistor 1 on the substrate and cracking the resistor 1 and causes migration to occur from the conductor 2 printed to the substrate, resulting in a loss of reliability.

OBJECT OF THE INVENTION

An object of the present invention is to provide an inorganic composition for forming an overcoat on ceramic substrates which has high flexural strength, is free of crack generation under rigorous service conditions, does not cause resistance change of thick film resistors or migration from thick film conductors, and is thus reliable.

SUMMARY OF THE INVENTION

Making intensive investigations the inventors have found that by adding mullite ($Al_6Si_2O_{13}$) powder to an inorganic composition for forming an overcoat on resistors and conductors on a low-temperature cofirable substrate, the overcoat is increased in strength to such an extent to prevent crack generation. The inventors have further found that by limiting the amount of mullite powder added to the range of from 10 to 30% by volume and adjusting a glass component so that the overcoat may have a controlled coefficient of thermal expansion in the range of from $50 \times 10^{-7}$ to $75 \times 10^{-7}/°$ C., a matched coefficient of thermal expansion with the ceramic substrate is achieved for effectively preventing crack generation.

Thus the present invention provides an inorganic composition for forming an overcoat on a ceramic substrate comprising 70 to 90% by volume of an inorganic glass component and 10 to 30% by volume of mullite powder, and having a coefficient of thermal expansion in the range of from $50 \times 10^{-7}$ to $75 \times 10^{-7}/°$ C. In a preferred embodiment of the overcoating inorganic composition, the mullite powder has a mean particle size of up to 5 μm. In a further preferred embodiment of the overcoating inorganic composition, the inorganic glass component is an $Al_2O_3SiO_2$-$B_2O_3$-PbO series glass containing 1 to 7% by weight of $Al_2O_3$, 20 to 25% by weight of $SiO_2$, 5 to 10% by weight of $B_2O_3$, 60 to 70% weight of PbO, and 0 to 5% by weight of $Cr_2O_3$. In a still further preferred embodiment of the overcoating inorganic composition, the ceramic substrate comprises 30 to 50% by weight of an $Al_2O_3$ component and 70 to 50% by weight of a glass component which contains 40 to 60% by weight of $SiO_2$, 0.5 to 5% by weight of $B_2O_3$, 6 to 17.5% by weight of oxide.

Since an overcoating inorganic composition contains 10 by 30% by volume of the inorganic composition of mullite ($Al_6Si_2O_{13}$) powder and has a coefficient of thermal expansion in the range of from $50 \times 10^{-7}$ to $75 \times 10^{-7}/°$ C. as defined above, the resulting overcoat has increased flexural strength and provides thermal expansion matched with the ceramic substrate, which are effective for preventing crack generation.

DETAILED DESCRIPTION OF THE EMBODIMENTS

Figure 1:
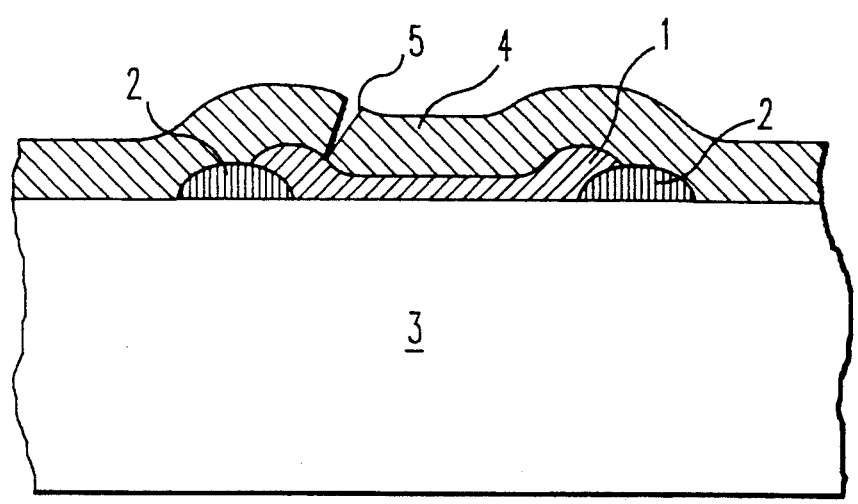
FIG. 1 is a cross-sectional view of a prior art ceramic substrate having an overcoat fired thereto.

Now the construction of the present invention is described in detail. The overcoating inorganic composition of the invention is applicable to various ceramic substrates having a coefficient of thermal expansion in the range of from $50 \times 10^{-7}$ to $75 \times 10^{-7}/°$ C. The composition is particularly suitable to low-temperature cofirable substrates, and the preferred ceramic substrates are comprised of 20 to 60% by weight, more preferably 30 to 50% by weight of an $Al_2O_3$ component and 80 to 40% by weight, more preferably 70 to 50% by weight of a glass component which contains 40 to 60% by weight of $SiO_2$, 0.5 to 5% by weight of $B_2O_3$, 6 to 17.5% by weight of $Al_2O_3$, and 25 to 45% by weight of an alkaline earth metal (Sr, Ba, Ca, Mg, etc.) oxide.

The inorganic glass component used in the overcoating inorganic composition of the invention may be selected from various glass components for adjusting to a coefficient of thermal expansion in the range of from $50 \times 10^{-7}$ to $75 \times 10^{-7}/°$ C. when it is mixed and fired with mullite powder. The inorganic glass suitable for such purpose is an $Al_2O_3$-$SiO_2$-$B_2O_3$-PbO series glass which preferably has a composition comprising 1 to 7% by weight of $Al_2O_3$, 20 to 25% by weight of $SiO_2$, 5 to 10% by weight of $B_2O_3$, and 60 to 70% by weight of PbO.

The addition of $Cr_2O_3$ is effective for improving absorption during laser trimming and matching of coefficient of thermal expansion. When added, the amount of $Cr_2O_3$ added is preferably from 0 to 5% by weight, more preferably from 1 to 3% by weight.

The above-defined composition is preferred because the respective components outside the above-defined ranges often make it difficult to provide a matching of coefficient of thermal expansion with ceramic substrates and cause the overcoat to crack.

The content of the inorganic glass component is preferably from 70 to 90% by volume of the overcoating inorganic composition. With a content of less than 70% by volume, no dense overcoat is formed at a firing temperature of 500 to 600° C. With a content of more than 90% by volume, the overcoat becomes low in flexural strength.

According to the present invention, mullite ($Al_6Si_2O_{13}$) powder is added to the above-defined inorganic glass component. Mullite is added in an amount of 10 to 30% by volume of the overcoating inorganic composition. If the amount of mullite is less than 10% by volume, the overcoat becomes low in flexural strength, allowing cracks to occur and the resistance to vary or drift. Inversely, if the amount of mullite is more than 30% by volume, the overcoat becomes low in flexural strength and no dense overcoat is formed at a firing temperature of 500 to 600° C. It will be understood that mullite may somewhat deviate from the stoichiometric composition defined above.

The mullite and inorganic glass component are preferably added in powder form having a mean particle size of up to 5 μm. More particularly, powders having a mean particle size of more than 5 μm can cause screen clogging and poor leveling during thick film printing of an overcoating paste. The lower limit of mean particle size for both the components is generally about 0.5 μm.

The composition of the present invention results in an overcoat having a coefficient of thermal expansion in the range of from $50 \times 10^{-7}$ to $75 \times 10^{-7}/°$ C. and a flexural strength of at least about 1,000 kgf/cm$^2$, preferably at least about 1,200 kgf/cm$^2$ and at most about 1,800 kgf/cm$^2$.

The overcoating inorganic composition is used by adding vehicles such as binder and solvent thereto to form a paste, printing the paste to a ceramic substrate where necessary, and baking at a temperature of 500 to 600° C. to form an overcoat The firing time is about 20 to about 50 minutes and the atmosphere is generally air. The overcoat is generally 10 to 30 μm thick.

The resulting overcoats provide a good match in coefficient of thermal expansion with the ceramic substrates and are resistant against migration from external conductor layers and cause no change of the resistance of resistor layers. The external conductor layers used may be well-known thick film conductor materials such as Ag-Pd and the resistor layers used may be well-known thick film resistor materials such as ruthenium oxide.

ADVANTAGES

As described above, the overcoating inorganic composition of the present invention has the ability to provide a highly reliable overcoat on ceramic substrates which has high flexural strength and does not induce cracks, a resistance change of thick film resistors and migration from thick film conductors even under rigorous service conditions.

EXAMPLE

Examples of the present invention are given below by way of illustration.

A ceramic substrate of the following composition was prepared and fired and thereafter, a thick film resistor based on ruthenium oxide is printed and baked.

The substrate had a composition consisting of 30% by weight of $Al_2O_3$ component and 70% by weight of a glass component which contained 46.0% by weight of $SiO_2$, 1.5% by weight of $B_2O_3$, 8.5% by weight of $Al_2O_3$, and 1.2% by weight of Ca, 3.3% by weight of BaO and 39.5% by weight of SrO as alkaline earth metal oxides. This substrate had a coefficient of thermal expansion of $64 \times 10^{-7}/°$ C.

Separately, overcoating inorganic compositions were prepared by finely dividing a glass material of the composition shown in Table 1 and mullite both to a mean particle size of 1.7 μm, mixing them in the proportion shown in Table 2, adding a resin and solvent to each mixture, and milling the mixture in a three roll mill to form a paste.

TABLE 1

| Sample desgn. | Glass composition (wt %) | | | | | Coefficient of thermal expansion ($\times 10^{-7}/°$C.) |
|---|---|---|---|---|---|---|
| | PbO | SiO$_2$ | B$_2$O$_3$ | Al$_2$O$_3$ | Cr$_2$O$_3$ | |
| a | 61 | 24 | 8.8 | 3.8 | 2.4 | 62 |
| b | 69 | 21 | 5.8 | 2.5 | 1.7 | 75 |
| c | 64 | 23 | 7.0 | 4.0 | 2.0 | 68 |
| d | 64 | 23 | 9.0 | 2.0 | 2.0 | 64 |
| e | 64 | 23 | 6.0 | 5.0 | 2.0 | 67 |
| f | 72 | 15 | 7.0 | 4.0 | 2.0 | 85 |

Each paste was printed on the resistor and baked at a temperature of 600° C. The substrate was then subject to a thermal shock test between −55° C. and 150° C. over 1,000 cycles whereupon the glass overcoat was observed for cracks.

The overcoating material was measured for flexural strength and coefficient of thermal expansion by placing the powder mixture prior to paste formation in a dry press, thereby shaping sheet specimens of 1 mm×5 mm×30 mm and 2 mm×2 mm×20 mm, and firing them at a temperature of 600° C. The measurement of flexural strength was by the three point bending test prescribed in JIS R-1602. The measurement of coefficient of thermal expansion used a thermal dilatometer of the horizontal quartz rod type. The results of measurement (Examples 1 to 6) are shown in Table 2.

Also shown for comparison purposes are the results of an overcoat having a coefficient of thermal expansion outside the range of the present invention due to a glass composition (Comparative Example 1) and an overcoat having an amount of mullite added outside the range of the present invention (Comparative Example 2).

TABLE 2

| | Overcoat composition | | | Coefficient of thermal expansion ($\times 10^{-7}/°$C.) | Flexural strength (kgf/cm$^2$) | Cracks after thermal shock |
|---|---|---|---|---|---|---|
| | Glass | | Mullite | | | |
| | Sample | vol % | vol % | | | |
| E1 | a | 80 | 20 | 55 | 1380 | None |
| E2 | b | 80 | 20 | 65 | 1400 | None |
| E3 | c | 85 | 15 | 61 | 1370 | None |
| E4 | c | 75 | 25 | 58 | 1350 | None |
| E5 | d | 80 | 20 | 56 | 1520 | None |
| E6 | e | 80 | 20 | 60 | 1340 | None |
| CE1 | f | 80 | 20 | 76 | 1400 | Some |
| CE2 | a | 65 | 35 | 52 | 980 | — |

As is evident from Table 2, the overcoats of Examples 1 to 6 according to the present invention had high flexural strength and generated no cracks after the thermal shock test. In contrast, the overcoat of Comparative Example 1, regardless of its strength, showed some cracks after the thermal shock test due to a mismatch of coefficient of thermal expansion. The overcoat of Comparative Example 2 had low flexural strength and was not fully consolidated at a baking temperature of 600° C.

Figure 2:
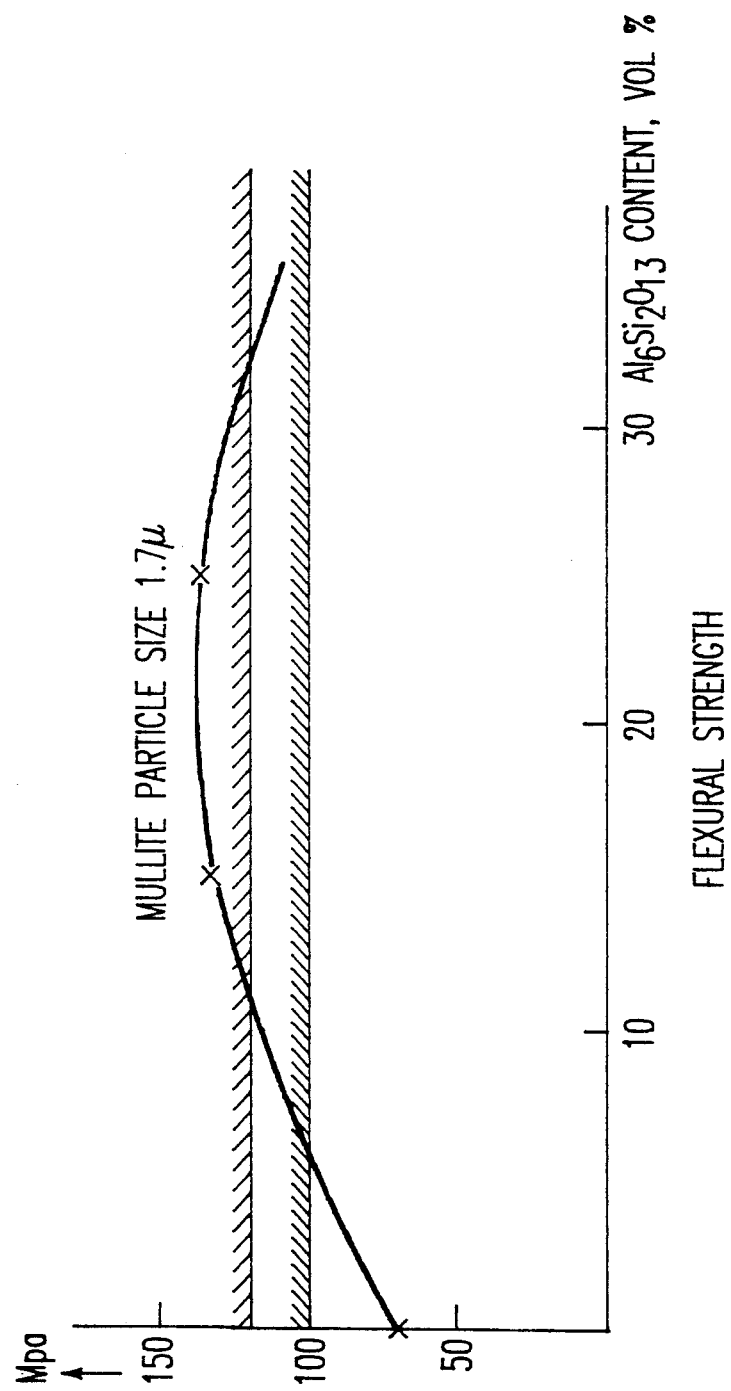
FIG. 2 is a graph showing flexural strength versus the amount of the mullite powder added.
Figure 3:
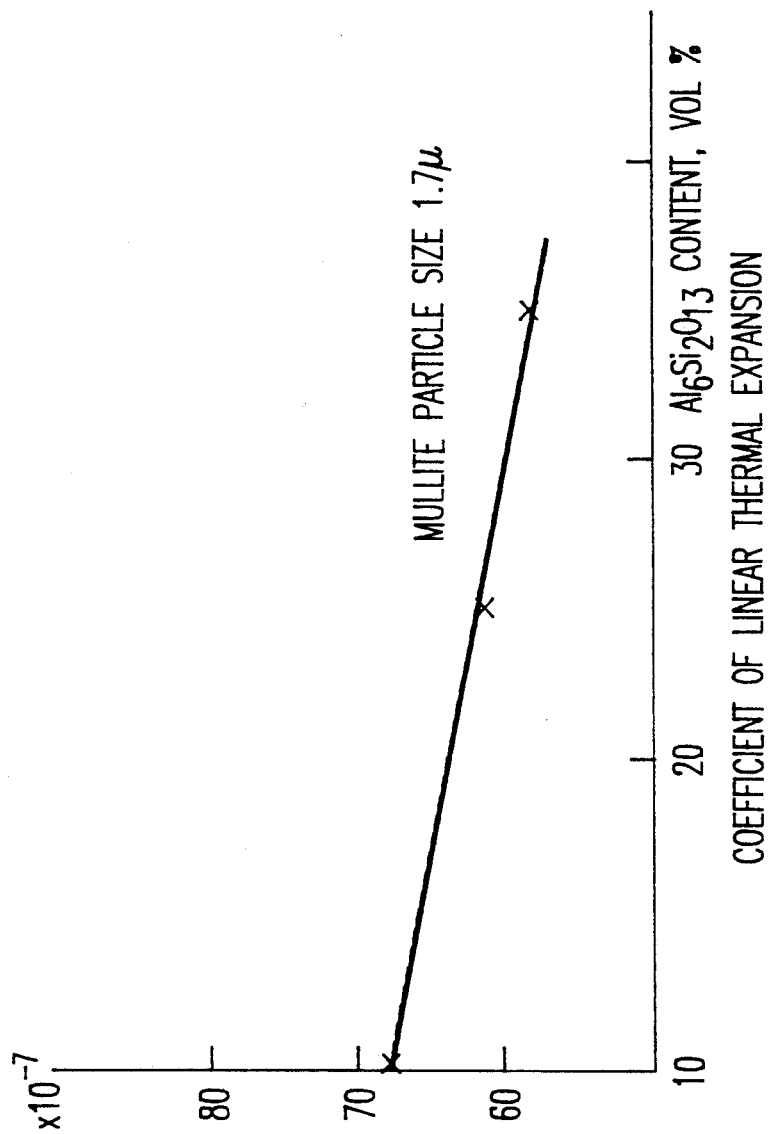
FIG. 3 is a graph showing coefficient of thermal expansion versus the amount of mullite powder added.

Next, sheet specimens were prepared by the same process as above by using the glass material designated Sample in Table 1 and changing the amount of mullite powder added. They were measured for flexural strength and coefficient of thermal expansion as overcoats by the same test methods as above, with the results shown in FIGS. 2 and 3.

Figure 4:
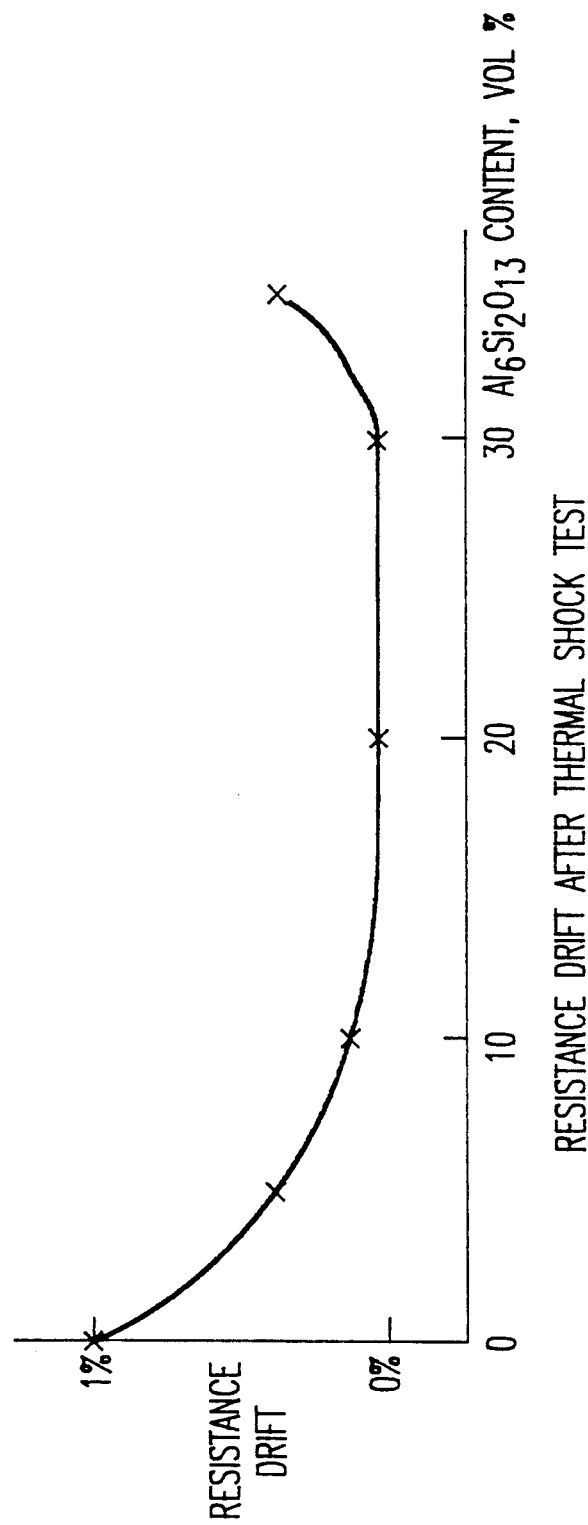
FIG. 4 is a graph showing resistance drift versus the amount of mullite powder added.
Figure 5:
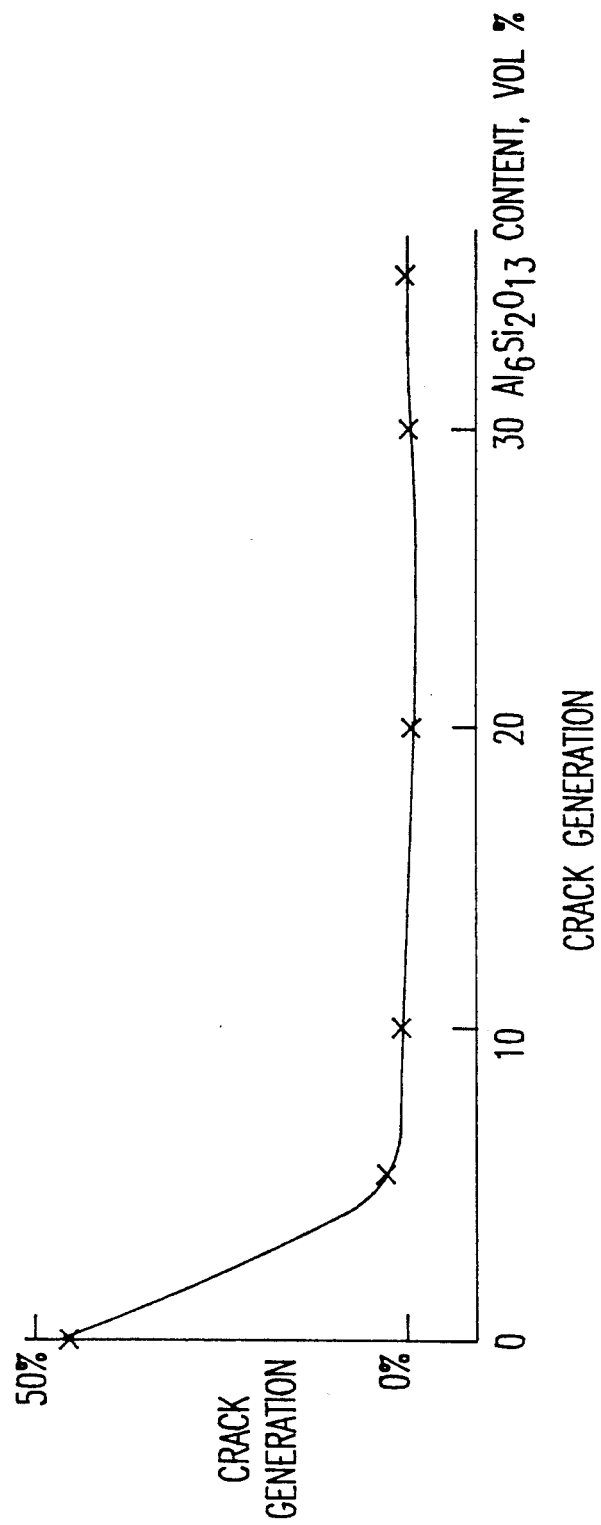
FIG. 5 is a graph showing percent crack generation versus the amount of mullite powder added.

Further, a paste was prepared in the same manner as above by using the glass material designated Sample a in Table 1 and changing the amount of mullite powder added, and then baked to the resistor on the substrate. The substrate was subject to a thermal shock test between $-55°$ C. and 150° C. over 1,000 cycles whereupon percent crack generation and resistance drift were measured. The results are shown in FIGS. 4 and 5. The percent crack generation was determined by preparing 140 ($=14\times10$) specimens with 14 specimens for each composition and observing them for cracks.

As seen from FIGS. 2 to 5, compositions having high flexural strength and a matching coefficient of thermal expansion with the substrate material were obtained by controlling the amount of mullite powder added to 10 to 30% by volume. These compositions were also found to induce no resistance change or cracking when applied to practical ceramic materials.

We claim:

1. An inorganic composition for forming an overcoat on a ceramic substrate comprising 70 to 90% by volume of an inorganic glass component and 10 to 30% by volume of mullite powder, the composition having a coefficient of thermal expansion in the range of from $50\times10^{-7}$ to $75\times10^{-7}/°$ C., wherein said inorganic glass component is an $Al_2O_3$-$SiO_2$-$B_2O_3$-$PbO$ series glass containing 1 to 7% by weight of $Al_2O_3$, 20 to 25% by weight of $SiO_2$, 5 to 10% by weight of $B_2O_3$, 60 to 70% by weight of PbO, and 0 to 5% by weight of $Cr_2O_3$.

2. The overcoating inorganic composition of claim 1 wherein said mullite powder has a mean particle size of up to 5 $\mu$m.

3. The overcoating inorganic composition of any one of claims 1 or 2 wherein said ceramic substrate comprises 20 to 60% by weight of an $Al_2O_3$ component and 80 to 40% by weight of a glass component which contains 40 to 60% by weight of $SiO_2$, 0.5 to 5% by weight of $B_2O_3$, 6 to 17.5% by weight of $Al_2O_3$, and 25 to 45% by weight of an alkaline earth metal oxide.

* * * * *